United States Patent [19]

Rees

[11] Patent Number: 5,344,114
[45] Date of Patent: Sep. 6, 1994

[54] VEHICLE SEAT ADJUSTER

[75] Inventor: Richard W. A. Rees, Rochester Hills, Mich.

[73] Assignee: ITT Corporation, New York, N.Y.

[21] Appl. No.: 40,478

[22] Filed: Mar. 31, 1993

[51] Int. Cl.$^5$ ............................................ F16M 13/00
[52] U.S. Cl. .................................. 248/430; 296/65.1
[58] Field of Search ..................... 248/424, 429, 430; 296/65.1

[56] References Cited

U.S. PATENT DOCUMENTS

| | | |
|---|---|---|
| 1,726,597 | 9/1929 | Templeton . |
| 2,031,248 | 2/1936 | Bishop . |
| 2,472,593 | 6/1949 | King . |
| 3,120,371 | 2/1964 | Dall . |
| 3,258,240 | 6/1966 | Kirk . |
| 3,507,472 | 4/1970 | Agee et al. . |
| 3,740,014 | 6/1973 | Swenson et al. . |
| 4,438,895 | 3/1984 | Rees ..................... 248/396 |
| 4,445,661 | 5/1984 | Langmesser, Jr. et al. ........ 248/394 |
| 4,463,922 | 8/1984 | Rees ..................... 248/429 |
| 4,487,459 | 12/1984 | Rees ................... 248/429 X |
| 4,511,187 | 4/1985 | Rees ................... 248/430 X |
| 4,513,937 | 4/1985 | Langmesser, Jr. et al. ........ 248/394 |
| 4,527,767 | 7/1985 | Rees ..................... 248/419 |
| 4,563,044 | 1/1986 | Rees ................. 296/65.1 X |
| 4,572,469 | 2/1986 | Rees ..................... 248/429 |
| 4,580,755 | 4/1986 | Rees ..................... 248/430 |
| 4,653,821 | 3/1987 | Faust ..................... 312/337 |
| 4,726,617 | 2/1988 | Nishimura ........................... 296/65.1 |
| 4,804,229 | 2/1989 | Nishino ............................ 248/430 X |
| 4,821,989 | 4/1989 | Munaka et al. ...................... 248/430 |
| 4,821,991 | 4/1989 | Aihara et al. ....................... 248/430 |
| 4,948,189 | 8/1990 | Terada et al. ....................... 296/65.1 |
| 4,969,622 | 11/1990 | Münchow et al. .................. 248/429 |
| 4,981,278 | 1/1991 | Rees .................... 248/430 |
| 5,048,787 | 9/1991 | Saitoh ................................. 248/430 |
| 5,048,886 | 9/1991 | Ito et al. ............................. 296/65.1 |
| 5,104,084 | 4/1992 | Kumagai et al. ................... 248/430 |
| 5,192,045 | 3/1993 | Yamada et al. ...................... 248/430 |

FOREIGN PATENT DOCUMENTS

| | | |
|---|---|---|
| 127453 | 4/1948 | Australia . |
| 810471 | 8/1951 | Fed. Rep. of Germany . |
| 1417978 | 10/1965 | France . |
| 828985 | 2/1960 | United Kingdom . |

Primary Examiner—Ramon O. Ramirez
Attorney, Agent, or Firm—Robert P. Seitter; J. Gordon Lewis

[57] ABSTRACT

A vehicle seat adjuster includes a pair of spaced upper tracks, each slidably mounted in one of a pair of lower tracks. A seat support arm connected to each upper tracks slidably extends through a slot formed in each lower track. A rod extends between each pair of track assemblies and releasably engages a notch formed in each support arm and one of a plurality of notches formed in the lower track to releasably lock the upper track in a stationary position relative to the lower track. A bearing conforming to the shape of the upper track is interposed between each upper and lower track. Support members are connected to each lower track to anchor each lower track to a vehicle floor. Cooperating resisting elements are formed in each upper and lower track pair and inter-engage under deforming load of the tracks and bearing to resist separation of the upper track from the lower track.

44 Claims, 4 Drawing Sheets

VEHICLE SEAT ADJUSTER

BACKGROUND OF THE INVENTION

1. Field of the Invention

The present invention relates, in general, to seats, and more specifically, to adjusters for vehicle seats.

Seat adjusters are used on the front seats of automotive vehicles to provide selective horizontal fore and aft movement of the seat to accommodate occupants, particularly drivers, of different size and height as well as to provide a comfortable seating position to suit each driver's preference. Such seat adjusters typically include a support frame which is connected to and supports a seat bottom and/or a seat back of a vehicle seat. A pair of spaced upper tracks are connected to the support frame and are each, in turn, slidably mounted in one of a pair of lower tracks which are anchored to the vehicle floor. A releasable lock mechanism is employed with such seat adjusters to lock the upper track, the support frame and the seat in any desired horizontal fore and aft position. The lock mechanism must be strong enough to hold the upper tracks and seat in a fixed horizontal position under loads acting on the seat during a collision to prevent injury to the occupant. Thus, the weight and size of the seat adjuster components are selected to provide a maximum amount of strength to resist any movement of the seat adjuster and the seat and to securely anchor the seat adjuster to the floor under high impact forces transmitted to the seat from the occupant during a vehicle collision.

Thus, the individual tracks, the seat support frame and the track anchors are made of stronger materials and in greater thicknesses and dimensions to provide the requisite amount of strength. Although this adds cost and weight to the seat, such efforts are considered essential to provide adequate strength to a seat to resist movement during a vehicle collision.

A recent trend in vehicle seat design is to incorporate the seat as part of the occupant protection or safety system. Test results embodied in Federal Motor Vehicle Safety Standards 208 and 210 require that seat belts and their anchorages withstand loads of 1500 to 3000 pounds without failure. If any seat belt anchor is mounted to the seat structure, the seat structure must also withstand such loads as well. The outboard (adjacent the door) upper and lower seat belts and their anchors should withstand a load of 1500 pounds and the inboard (adjacent the vehicle centerline) lower seat belt point should withstand a load of 3000 pounds.

However, despite the added load the seat belts add to a vehicle seat frame, it is still desirable to mount the seat belt directly to the seat track assembly since adjustment of the seat by an occupant would not require readjustment of the seat belt. Further, integration of the seat belt mounting to the seat track assembly enables the seat and seat belt to be designed as a unitary structure so as to simplify vehicle floor pan construction and installation at the vehicle assembly plant.

At the same time, increased emphasis on fuel economy and the imposition of higher federally mandated fuel economy standards necessitate vehicle weight reduction. This makes it desirable to reduce the weight of the vehicle seat, but such weight reduction is directly opposed to the high strength requirements noted above.

Thus, it would be desirable to provide a vehicle seat adjuster which meets the need for high strength to prevent seat and seat belt anchorage movements or track separation under collision impact loads. Furthermore, it would be desirable to provide a vehicle seat adjuster which allows easy fore and aft adjustment, and, at the same time, minimizing weight and manufacturing cost.

SUMMARY OF THE INVENTION

The present invention is an adjuster for a vehicle seat which provides easy horizontal fore and aft movement of the seat relative to the vehicle floor, minimal seat weight and, at the same time, high strength to resist separation of the seat adjuster components and movement of the seat during impact loads acting on a seat during a vehicle collision.

In one embodiment, the seat adjuster comprises first and second track assemblies. Each of the track assemblies includes a lower track having a bore extending longitudinally therethrough. A longitudinally extending slot is formed in each lower track and opens to the bore. An upper track is slidably mounted in the bore in each lower track. A support arm is connected to the upper track and slidably extends outward through the slot in the lower track. Bearing means are disposed in the bore in the lower track between the upper track and the lower track for slidingly engaging the upper track with the lower track. Support means are connected to the lower track for mounting the lower track in a stationary position on the vehicle floor.

Cooperating resisting means are formed in the upper and lower tracks for resisting separation of the upper track from the lower track in a direction substantially perpendicular to the longitudinal axis of the bore in the lower track. Finally, lock means are provided for releasably locking the upper track against movement relative to the lower track. The lock means includes a generally U-shaped rod having two legs joined by a central bight portion. One end of each leg of the rod is pivotally connected to one of the seat support arms, with the two legs extending forwardly to the bight portion located between the first and second track assemblies.

Preferably, the upper and lower tracks are formed of extruded aluminum for reduced weight. The cooperating resisting means preferably comprises at least one notch formed in and extending longitudinally along one of the upper and lower tracks. A longitudinally extending flange is formed on the other of the upper and lower tracks. The flange extends outwardly from the other of the upper and lower tracks into sliding engagement with the notch in the one track and engages the notch under deformation forces acting to move one end of the upper track out of the slot in the lower track.

In a preferred embodiment, a pair of notches are spacedly formed on and extend longitudinally along the lower track. A pair of spaced flanges are formed on and extend longitudinally along the upper track and are each disposed in a nominal spaced position within each notch in the lower track.

In an exemplary embodiment, a lower portion of the upper track has a plurality of angularly disposed exterior faces. The bearing means includes a cage having a plurality of spaced rows of apertures formed therein. A roller formed of a high compression resistant plastic is slidably disposed in each aperture in the cage and engages an adjacent angular exterior face of the inner track and an opposed inner surface of the lower track when the cage is formed around and to the shape of the upper track. The apertures in the cage are arranged to be disposed adjacent one of the exterior faces of the upper track for mounting a roller in contact with a face of the upper track. The rows of apertures and rollers in the cage are spaced apart at any predetermined spacing dependent upon expected force loads.

The lock means preferably comprises catch means formed on each lower track. A notch is formed in the support arm connected to the upper track. Each rod leg has a latch portion that engages the catch means in the lower track and the notch in the seat support arm connected to the upper track. Upon pivoting the rod about the ends of the legs in first and second opposed directions the latch portion of the rod alternately engages and disengages the lower track. Preferably, the catch means comprises a plurality of spaced, co-linearly arranged, open-ended notches formed in flanges extending outward from the lower track.

The support means preferably comprises first and second support members associated with opposite ends of each lower track. Each of the first and second support members includes a base mounting portion and a lower track connecting portion. The lower track connecting portion of each of the first and second support members is connected to opposite ends of a lower track. An aperture is formed in the lower track connecting portion of each of the first and second support members and is sized to permit the upper track to slidably pass therethrough. At the same time, the lower track connecting portion of each of the support members prevents the bearing means from sliding out of the lower track.

The support means is provided in various configurations including metallic support members which are attached opposite ends of each lower track by means of threaded fasteners. In another embodiment, the metallic support members are riveted to opposite ends of each lower track. In yet another embodiment, the support members are formed of a high strength plastic and are connected to opposite ends of each lower track by means of threaded fasteners or by adhesive.

Finally, stop means are mounted on the seat support arm of each upper track and engage the lower track connecting portion of the lower track support members for establishing maximum travel positions of the upper track in horizontally fore and aft directions.

The vehicle seat adjuster of the present invention meets the design criteria of current vehicle seats by providing a seat adjuster having a reduced weight and lower manufacturing cost, while at the same time, providing the high requisite strength to maintain the seat in a stationary position under impact loads acting on the seat, as well as to prevent separation of the upper and lower tracks of the seat adjuster during such loads. The seat adjuster of the present invention provides the high strength required for integral seat belt anchorage directly to the seat adjuster. This enables the entire vehicle seat, seat adjuster and seat belt assembly to be integrated into a single unit for ease of manufacturing, shipping and installation. The vehicle seat adjuster of the present invention also includes various lower track support members to suit many different mounting configurations and, in one embodiment uniquely enables high strength plastic to be employed as a track support which further reduces the weight of the seat adjuster.

BRIEF DESCRIPTION OF THE DRAWINGS

The various features, advantages and other uses of the present invention will become more apparent by referring to the following detailed description and drawings in which.

DESCRIPTION OF THE PREFERRED EMBODIMENTS

Figures 1, 3:
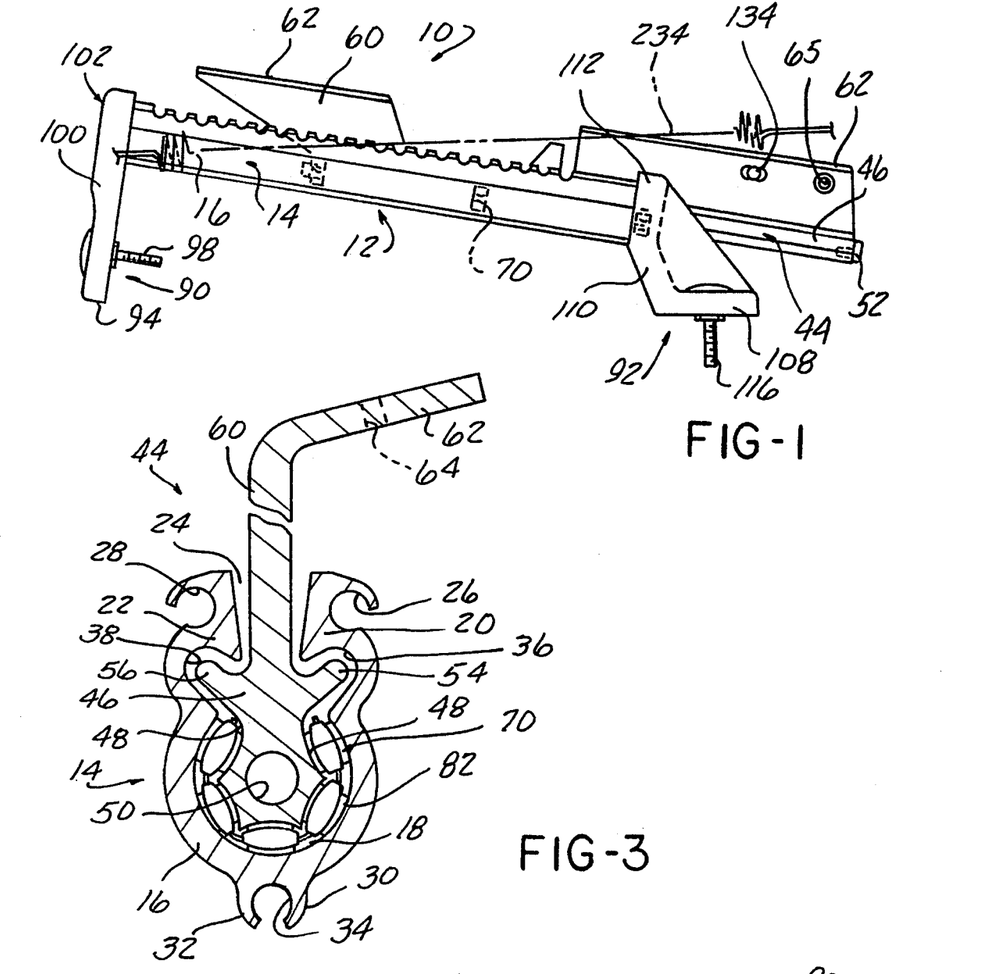
FIG. 1 is a side-elevational view of a seat adjuster of the present invention, with the upper track shown in a rearward position.
FIG. 3 is a cross-sectional view, generally taken through the joined upper and lower tracks of one of the track assemblies of the seat adjuster shown in FIGS. 1 and 2.

Referring now to the drawing, and to FIG. 1 in particular, there is depicted a seat adjuster 10 for use in an automotive vehicle to adjustably position a conventional vehicle seat to a vehicle floor and to provide selective horizontal fore and aft positioning of the seat as desired by the occupant. The seat adjuster 10 is preferably a manual seat adjuster; although it will be understood that the teachings of the present invention are equally applicable to power seat adjusters utilizing drive motors to adjust the position of the seat as desired.

Figure 2:
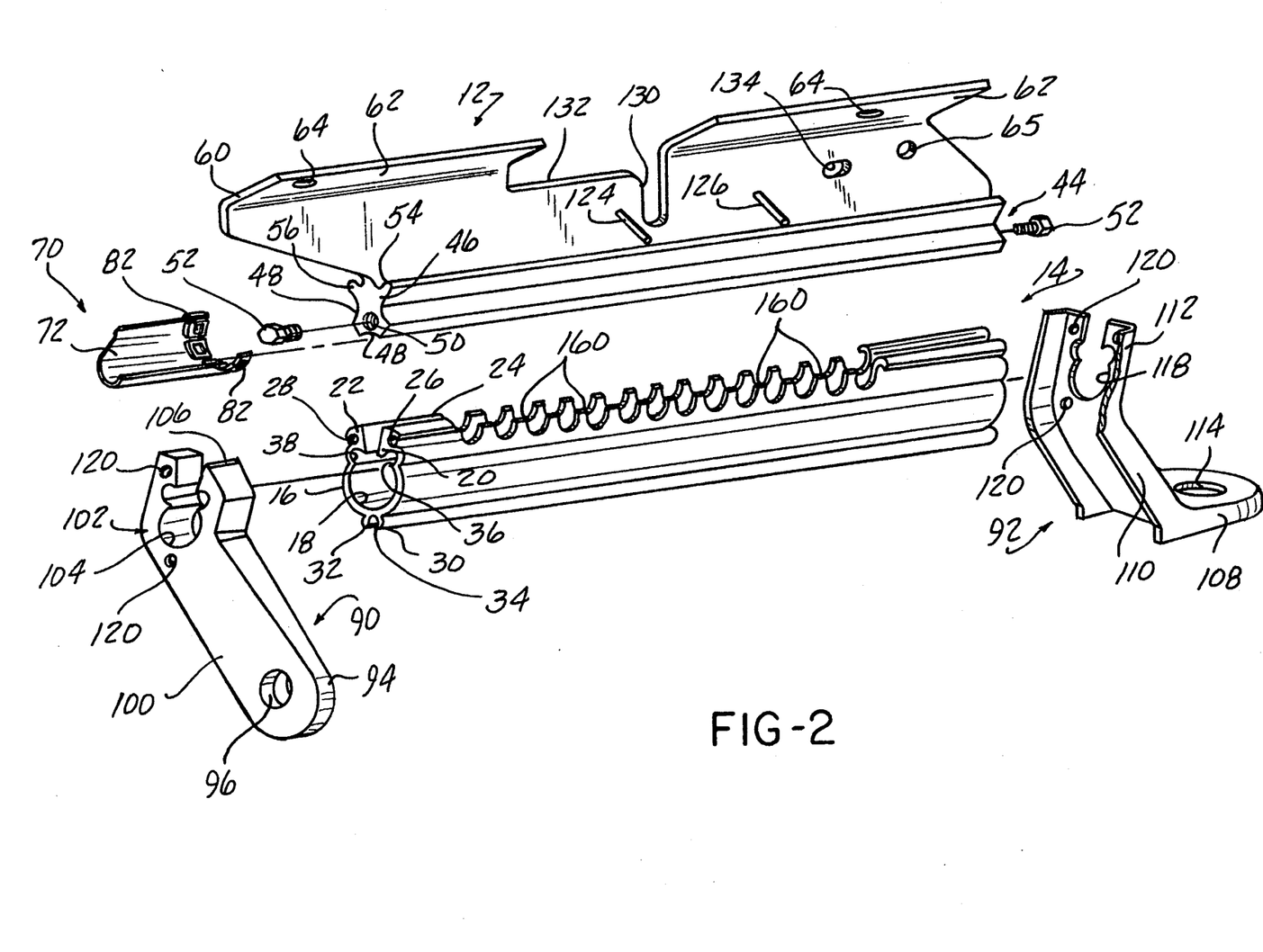
FIG. 2 is an exploded, perspective view of a portion of the seat adjuster shown in FIG. 1.

As is conventional, the seat adjuster 10 includes first and second track assemblies 12, with only one of the track assemblies 12 being depicted in FIGS. 1 and 2. The first and second track assemblies 12 are substantially identical to each other, but include symmetrically opposite portions for mounting on opposite lateral edges of a vehicle seat. Each of the track assemblies, such as track assembly 12, is designed to be connected to and support a vehicle seat, not shown, by means of fasteners which connect to a seat frame forming a part of the seat bottom of a vehicle seat.

Due to the symmetrical nature of the first and second track assemblies, the following description will be provided only for the first track assembly 12. It will be understood that the opposed second track assembly is substantially identically constructed.

As shown in FIGS. 1 and 2, in one embodiment, first track assembly 12 includes a lower track 14 which is preferably formed of a lightweight, metallic material, such as aluminum and magnesium. Preferably, the track 14 is extruded to the depicted shape. The lower track 14 includes a substantially circular bottom portion 16 which has a bore 18 formed therein and extending longitudinally along the lower track 12. A pair of spaced flanges 20 and 22 extend outward from the bottom portion 16 and are spaced apart to form an elongated slot 24 which also extends longitudinally along the length of the lower track 14. The slot 24 opens to the central bore 18 formed in the bottom portion 16 of the lower track 14. The outer ends of the flanges 20 and 22 are curved over in an arcuate shape and define bores 26 and 28, respectively, in conjunction with the adjacent portion of the flanges 20 and 22. The bores 26 and 28 are threaded to provide attachment of lower track support means, as described hereafter.

A pair of short length, depending flanges 30 and 32 extend below the bottom portion 16 of the lower track 14. The flanges 30 and 32 are arcuate in shape and define a circular bore 34 therebetween which is threaded for receiving fasteners to attach to the lower track support means to the lower track 14. Finally, a pair of internally disposed notches 36 and 38 are formed in the lower track 14 in communication with the bore 18. The function of the notches 36 and 38 will be described in greater detail hereafter.

The first track assembly 12 also includes an upper track denoted generally by reference number 44. The upper track 44 includes a bottom portion 46 which is slidably disposed within the bore 18 in the lower track 14. The upper track 44 is also preferably formed of a lightweight metallic material such as aluminum or magnesium. The upper track 44 may be extruded to the illustrated shape. Although the bottom portion 46 of the upper track 44 may have any shape, such as circular, square, etc., in a preferred embodiment, the bottom portion 46 is formed with a plurality of angularly disposed, arcuate shaped faces, each denoted by reference number 48. Five arcuate faces 48 are formed in the bottom portion 46 and form separate exterior faces on the upper track 44 which are spaced from the inner surface of the bottom portion 16 of the lower track 14 when the upper track 44 is slidably mounted in the bore 18 in the lower track 14. A threaded bore 50 is formed in each end of the bottom portion 46 of the upper track 44 and receives a fastener 52 having an enlarged head.

A pair of outwardly extending, spaced flanges 54 and 56 are formed in the upper track 44 immediately adjacent the bottom portion 46. The flanges 54 and 56 are slidably disposed within the notches 36 and 38, respectively, in the lower track 14. Upon deformation loads imposed on one end of the first track assembly 12, such as during a vehicle collision, one or both of the flanges 54 and 56 will be brought into engagement with the corresponding notch 36 and 38 in the lower track 14 and forcibly engage the lower track 14 to resist separation of the upper track 44 from the lower track 14.

A seat support arm 60 is connected to and extends outward from the bottom portion 46 of the upper track 44. The seat support arm 60 has inwardly angled upper flanges 62, each having an aperture or slot 66 formed therein for receiving suitable fasteners to mount a vehicle seat and, in particular, the seat support frame, not shown, to the seat support arm 60.

As shown in FIGS. 2 and 3, when the upper track 44 is mounted in the lower track 14, the seat support arm 60 slidably extends through the slot 24 in the lower track 14 and extends outward from the lower track 14. Preferably, the seat support arm 60 and upper flanges 62 are integrally formed as an extrusion with the bottom portion 46 and the flanges 54 and 56 of the upper track 44. A seat belt mounting aperture 65 is formed in the seat support arm 60 to integrally attach a seat belt to the seat support arm 60.

Figures 4, 5:
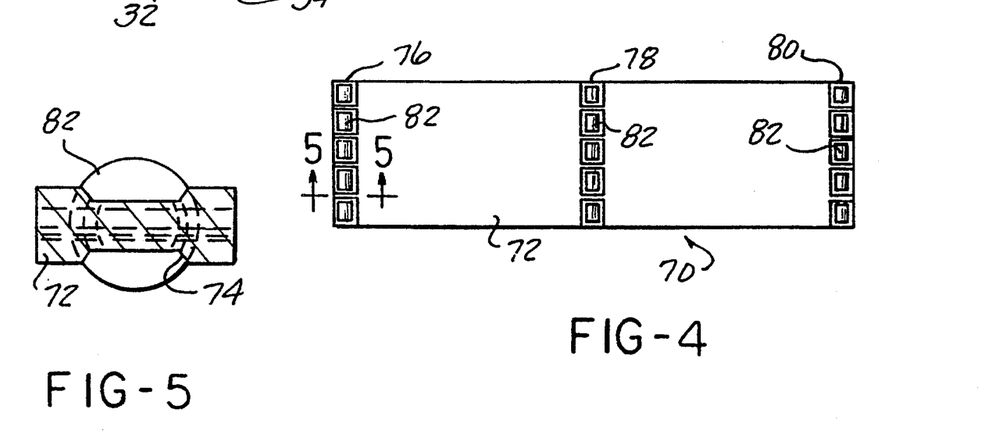
FIG. 4 is a plan view of the bearing means shown in a pre-assembly, flattened condition.
FIG. 5 is a cross-sectional view generally taken along line 5—5 in FIG. 4 and showing the roller mounting in the bearing means.

A bearing means 70, shown in FIGS. 3, 4 and 5, is mounted between the inner surface of the lower track 14 and the angular faces 48 on the bottom portion 46 of the upper track 44. The bearing means 70 slidably engages the lower track 14 and the upper track 44 and provides easy sliding movement of the upper track 44 within the lower track 14. The bearing means 70 includes a cage 72 which, prior to assembly, has a generally planar shape as shown in FIG. 4. The cage 72 is formed of a suitable, high strength material, such as plastic and, in particular, NYLON. A plurality of apertures 74 arranged in spaced rows are formed in the cage 72. The spacing between the rows of apertures 74 and the number of apertures 74 in each row is selected depending upon the expected force loads to be imposed on the track assembly 12. Thus, although three rows 76, 78 and 80, each containing five apertures 74, are shown at equal spaced intervals in FIG. 4, a different number of rows as well as a different spacing between adjacent rows and a different number of apertures 74 in each row may also be provided.

A roller 82 having a generally cylindrical shape is rollably disposed within each aperture 74 in the cage 72, preferably by a snap-in-fit. The roller 82 is also formed of a suitable material, with a carbon fiber reinforced polyphthalamide being employed in an exemplary embodiment. The cage 72 is formed with enlarged portions surrounding each aperture 74 to provide a suitable mount for each roller 82. It will also be understood that the bearing means may take other forms, such as the ball bearings mounted in a slidable casing as shown in Applicant's U.S. Pat. No. 4,981,278.

The use of a plastic material to form each roller 82, which, in a preferred embodiment, is a plastic having high compressibility and high creep resistance affords advantages over metal rollers and balls. Since the plastic rollers 82 are capable of a certain amount of compression, loads imposed on the seat will cause compression of the rollers 82 without forcing the rollers 82 into the surface of the tracks 14 and 18 which, in prior art seat adjuster track construction has resulted in notches or grooves being formed in such tracks which provide audible noise during movement of the track and/or a non-smooth adjustment movement of the vehicle seat. Since the plastic rollers 82 are capable of absorbing high amounts of load, the tracks themselves can be formed of a lightweight material, such as aluminum or magnesium, without concern for the formation of notches or grooves in such tracks caused by high forces or loads acting on the tracks and bearing.

As shown in FIGS. 2 and 3, after the rollers 82 have been mounted in each of the apertures 74 in the cage 72, the cage 72 is then bent around the bottom portion 46 of the upper track 44 to bring one roller 82 in each of the rows 76, 78 and 80 into engagement with one arcuate face 48 in the bottom portion 46 of the upper track 44. Adjacent rollers 82 in each row 76, 78 and 80 are disposed in rolling contact with adjacent faces 48 on the upper track 44. As shown in FIG. 3, each of the rollers 82 rollably engages one of the arcuate faces 48 in the upper track 44 and the inner side wall of the bottom portion 16 of the lower track 14.

The cage 72 has a length shorter than the overall length of the lower track 14. During sliding movement of the upper track 44 in the lower track 14, as described hereafter, the cage 72 slides within the lower track 14, but for only approximately one-half of the distance of movement of the upper track 44. The cage 72 is retained with in the lower track 14 by means of the support means used to anchor the lower track 14 to the vehicle floor, as described hereafter. In addition, the enlarged heads on the fasteners 52, mounted at opposite ends of the upper track 44, retain the cage 72 on the upper track 44 when one end of the upper track 44 is completely disposed within the lower track 14.

Figure 7:
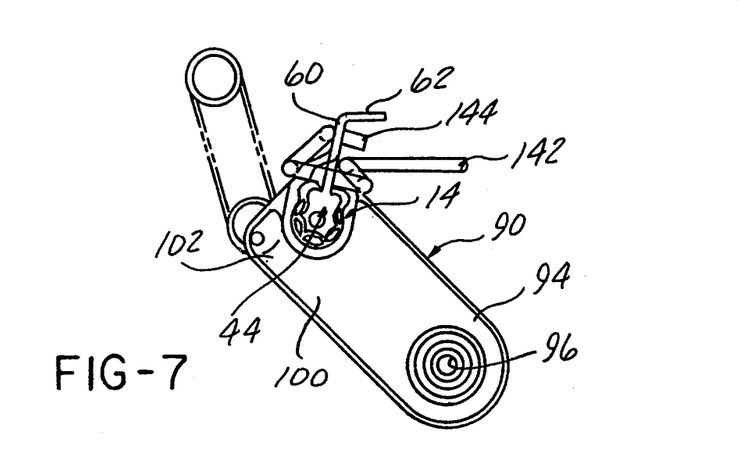
FIG. 7 is a front elevational view of one of the track assemblies of the seat adjuster shown in FIG. 1.

As shown in FIGS. 1 and 2, the first track assembly 12 includes support means for securely supporting and anchoring the lower track 14 to a vehicle floor. The support means preferably comprises first and second support members 90 and 92 which are connected to opposite ends of the lower track 14. Each support member 90 and 92 generally includes a floor mounting portion, a lower track connecting portion and an arm portion extending between the floor mounting portion and the lower track mounting portion. For the support member 90, shown in FIGS. 1, 2 and 7 which is connected to one end of the lower track 14, the first support member 90 is formed of a single piece metallic body, i.e. steel, by having a floor mounting portion 94 with an aperture 96 formed therein adapted to receive a suitable fastener 98 for attachment to the vehicle floor, an intermediate arm portion 100 and a lower track connecting portion 102. The intermediate arm portion 100 is disposed at an angle between the floor mounting portion 94 and the lower track connecting portion 102, as shown in FIGS. 2 and 7.

The lower track mounting portion 102 includes an aperture 104 which is smaller than the central bore 18, but has the same size and shape notches as the notches 36 and 38 in the lower track 14. A slot 106 extends through the upper end of the lower track connecting portion 102 into communication with the aperture 104 and is alignable with the slot 24 in the lower track 14. The slot 106 and the aperture 104 enable the upper track 44 to slide out of the one end of the lower track 14 through the first support member 90 during forward movement of the upper track 44 with respect to the lower track 14.

It should be noted that the support member 90, shown in FIG. 2, is particularly devised for mounting on the inboard side (adjacent the vehicle centerline) of the vehicle seat on which the seat adjuster 10 of the present invention is mounted. The corresponding outer support member for the adjacent track has a generally similar configuration, but with a slightly different angle between the floor mounting portion 94 and the lower track connecting portion 102.

The second or rear support member 92 also includes a floor mounting portion 108, an intermediate arm portion 110 and a lower track connecting portion 112. A bore 114 is formed in the floor mounting portion 108 to receive a suitable fastener 116 therethrough for connecting and securely anchoring the support member 92 to the vehicle floor. The intermediate portion 110 of the support member 92 extends outwardly and upwardly from the floor mounting portion 108 to dispose the lower track connecting portion 112 adjacent one end of the lower track 14. An aperture 118 is formed adjacent the upper end of the support member 92 that is smaller than the central bore 18, but has the same size and shape as the notches 36 and 38 and the slot 24 in the lower track 14 to enable the upper track 44 to slide outward from the lower track 14 through the aperture 118 when the upper track 44 is moved rearward with respect to the lower track 14.

In this embodiment of the support means, both support members 90 and 92 are formed of a high strength metal, such as steel. Bores 120 are formed in the lower track connecting portions 102 and 112 of the support members 90 and 92, respectively, and receive suitable fasteners, such as threaded screws, which extend through the bores 120 into mating bores 26, 28 and 34 formed in the ends of the lower track 14. In this manner, the support members 90 and 92 are securely connected to the lower track 14 at opposite ends of the lower track 14. Although the upper track 44 can pass through the support members 90 and 92 during horizontal fore and aft movement, the bearing means 70 disposed within the lower track 14 is held captive within the lower track 14 by means of abutment with the support members 90 and 92 which prevent the bearing means 70 from sliding out of the lower track 14.

Stop means in the form of a pair of spaced pins 124 and 126, FIG. 2, are mounted on the seat support arm 60 and extend laterally outward therefrom. The pins 124 and 126 are welded or press fit into apertures in the seat support arm 60 and act as stops to limit forward and rearward movement, respectively, of the upper track 44 when the pins 124 and 126 engage the support members 90 and 92.

Figure 6:
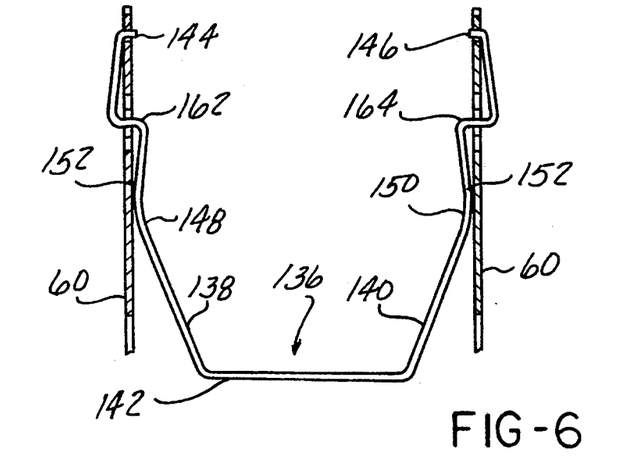
FIG. 6 is a plan view of the handle forming a part of the lock means of the seat adjuster of the present invention.

The seat adjuster 10 is also provided with releasable lock means for releasably locking the upper track 44 against movement with respect to the lower track 14. As shown in FIGS. 1 and 2, the releasable lock means includes a notch 130 formed in a centrally located cutout 132 in the seat support arm 60 connected to the upper track 44. The notch 130 extends substantially vertically in the normal mounting position of the seat adjuster 10 on a vehicle floor. An aperture or slot 134 is also formed in one end of the seat support arm 60 as shown in FIG. 2. A corresponding aperture 134 is formed in the seat support arm of the opposite seat track assembly. As shown in FIGS. 6 and 7, a handle 136 generally in the form of a U-shaped rod is provided with two opposed legs 138 and 140 which are connected at one end by a central bight portion 142. The opposite ends 144 and 146 of the legs 138 and 140, respectively, of the handle or rod 136 are pivotally mounted in the apertures 134 in the seat support arms 60 of the first and second track assemblies. This enables the handle 136 to exhibit pivotal movement about the ends 144 and 146 from a first position in which a portion of the handle 136 engages a latch means to lock the upper track 44 in a fixed position relative to the lower track 14 and an opposite or second position in which the handle 136 is disengaged from the latch means and enables free sliding movement of the upper track 44 relative to the lower track 14.

Each leg 138 and 140 of the handle 136 includes a cam portion 148 and 150, respectively, which engages an inner camming surface on the seat support arm 60. A low friction bearing 152 is mounted on the inner surface of each seat support arm 60 to provide free sliding movement of the cams 148 and 150 during pivotal movement of the handle 136, as described above. By reason of the outward diversion of the legs 138 and 140, the cam portions 148 and 150 act to stress the handle 136 during upward pivotal movement of the handle 136. The inherent resiliency of the handle or rod 136 resists such compression and serves to urge the handle 136 by reason of the cam portions 148 and 150 engaging the camming surfaces on the seat support arms 60 in an opposite or second direction, i.e., downwardly. This urges the rod 136 downwardly into a locked position at all times except when the occupant grasps and pivots the rod 136 upward to adjust the horizontal fore and aft position of the seat.

As shown in FIGS. 1 and 2, a plurality of catches 160 are formed in the lower track 14 as part of the latch means. Preferably, a plurality of co-linear, spaced catches 160, each in the form of an open-ended notch are formed in aligned pairs in the upstanding flanges 20 and 22 on the lower track 14. The handle 136 includes an outward extending latch portion 162 and 164 on each leg 138 and 140, respectively, which passes through the notch 130 in the seat support arm 60 of each track assembly 12 and into a selected one of the catches 160 to lock the upper track 14 and the seat attached thereto in a fixed, stationary position relative to the lower track 14. Upward pivotal movement of the bight portion 142 of the rod 136 releases the latch portions 162 and 164 on the legs 138 and 140 from one aligned pair of catches 160 in the lower track 14 to enable the position of the upper track 44 to be adjusted horizontally either fore or aft with respect to the lower track. Release of the bight portion 142 of the handle 136, due to the normal downward biasing of the handle 136 through the cams 148 and 150, will bring the latch portions 162 and 164 on the rod 136 into engagement with another aligned pair of catches 160 to again stationarily lock the upper track 44 in a fixed position relative to the lower track 14.

Figure 8:
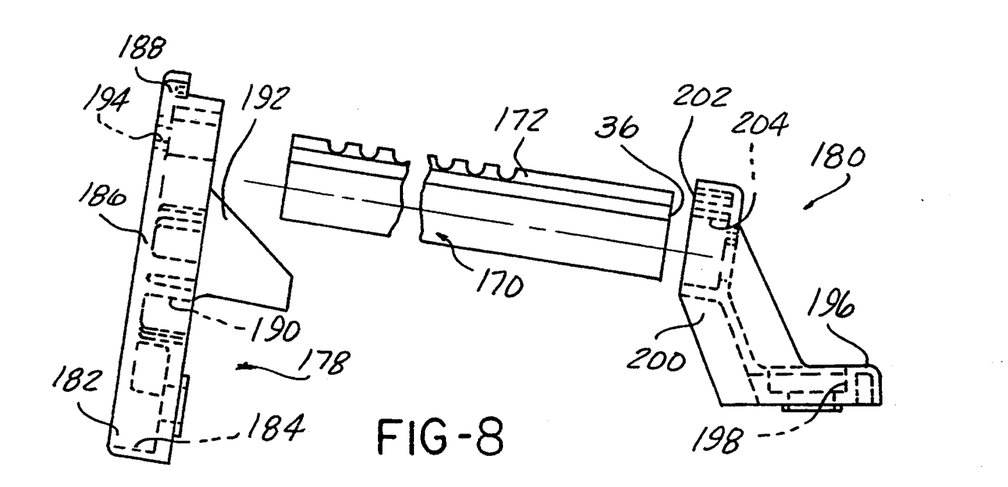
FIG. 8 is an exploded side elevational view of a second embodiment of the lower track and lower track support means.

Referring now to FIG. 8, there is depicted another embodiment of the lower track support means used to stationarily anchor a lower track 170 of the track assemblies 12 to the vehicle floor. In this embodiment, the lower track 170 has a somewhat different configuration than the lower track 14 described above and shown in FIG. 2. In this embodiment, the lower track 170 still includes a central aperture 18 and spaced notches 36 and 38. Further, a pair of upstanding flanges 172 extend upward from the notches 36 and 38 and form a slot therebetween for slidingly receiving the seat support arm 60 therethrough in the same manner as described above in the first embodiment of the lower track 14.

In this embodiment, the support means comprises first and second support members 178 and 180 which are connected to opposite ends of the lower track 170. The front-most support member 178 is formed of a plastic material reinforced by long glass fibers. The support member 178 includes a vehicle floor mounting portion 182 having a bore 184 extending therethrough for receiving a suitable fastener to attach the support member 178 to the vehicle floor. A central arm portion 186 extends from the floor mounting portion 182 to a lower track connecting portion 188. A series of webs 190 are formed within the support member 178 for strength as well as to reduce the overall weight of the support member 178. A rib 190 also extends rearward of the intermediate arm portion 186 and is adapted to rest on a portion of the vehicle floor. An aperture 194 is formed in the lower track mounting portion 188 and communicates with the bore 18 and the notches 36 and 38 in the lower track 170 to slidingly receive the upper track 44 therethrough while blocking escape of the bearing means 70 from between the upper and lower tracks 44 and 170. The lower track connecting portion 188 of the support member 178 is securely attached to one end of the lower track 70 by means of a suitable adhesive.

Similarly, the corresponding support member 180 has a vehicle floor mounting portion 196 with an aperture 198 formed therein for receiving a suitable fastener therethrough. An intermediate arm portion 200 extends from the floor mounting portion 196 to a lower track connecting portion 202. An aperture 204 is formed in the lower track mounting portion 188 and communicates with the bore 18 and the notches 36 and 38 in the lower track 170 to slidingly receive the upper track 44 therethrough while blocking escape of the bearing means 70 from between the upper and lower tracks 44 and 170. The support 180 is likewise securely attached to one end of the lower track 170 by means of an adhesive.

The support members for the opposite track assembly are generally similar to the support members 178 and 180, except for minor variations in shape between floor mounting portions and the lower track connecting portion.

Figures 9, 10:
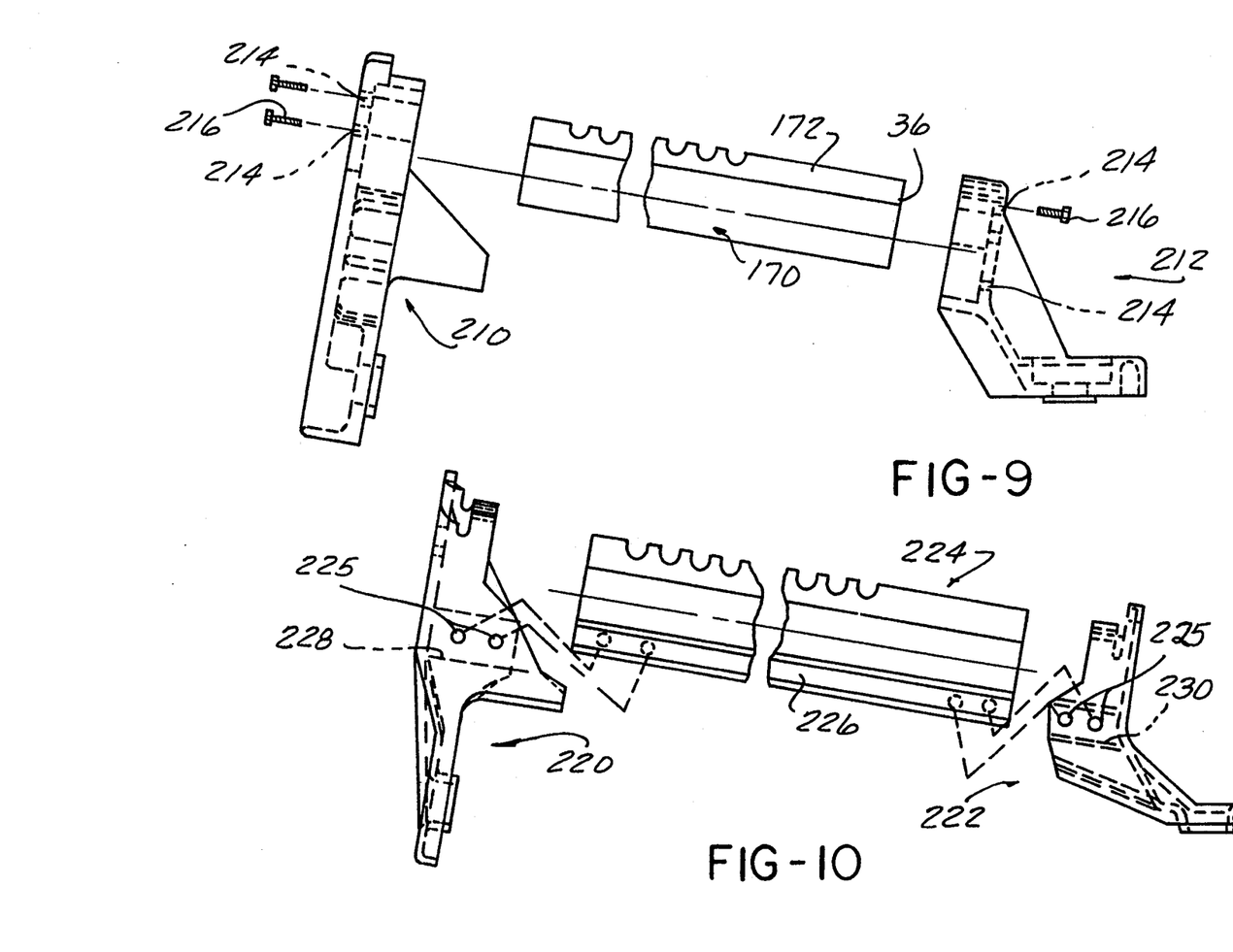
FIG. 9 is an exploded, side elevational view of a third embodiment of the lower track support means.
FIG. 10 is an exploded, side elevational view of a fourth embodiment of the lower track support means.

Another embodiment of the support means of the present invention is shown in FIG. 9. In this embodiment, support members 210 and 212 are likewise formed of a high strength engineering plastic material and has substantially the same shape as the support members 178 and 180 described above and shown in FIG. 8. However, in this embodiment, the lower track connecting portions of the support members 210 and 212 are provided with a plurality of apertures 214 which are alignable with the threaded bores 26, 28 and 34 in the lower track 14. The apertures 214 and bores 26, 28 and 34 receive threaded fasteners 216, such as screws, for securely connecting the support members 210 and 212 to opposite ends of the lower track 14.

Another embodiment of the support means is shown in FIG. 10. In this embodiment, support members 220 and 222 and lower track 224 are formed of metal. The support members 220 and 222 are securely connected to opposite ends of the lower track 224 by means of rivets 225. The lower track 224 is similar to lower track 14 but includes a depending flange 226. The flange 226 nests against thin sections 228 and 230 in the support members 110 and 222 and is secured thereto by rivets 225 which are mounted on apertures in the nested sections or are self-piercing directly through the nested sections.

Finally, as shown in FIG. 1, a biasing spring 234 may be optionally connected between the seat frame at one end and one of the lower track supports, such as support member 90, at another end to provide a biasing force to assist in moving the seat in a forward direction.

In summary, there has been disclosed a unique seat adjuster which has a low weight and a low manufacturing cost while, at the same time, provides the requisite high strength needed for integrated attachment of the vehicle seat belt directly to the seat adjuster. The present seat adjuster is designed to prevent separation of the upper and lower tracks of the seat adjuster during impact loads imposed on the seat adjuster by the occupant during a vehicle collision.

What is claimed is:

1. A seat adjuster for supporting a vehicle seat on a floor of a vehicle comprising:
   first and second space track assemblies, each of the first and second track assemblies including:
   a lower track having a bore extending longitudinally therethrough, a longitudinally extending slot formed in the lower track and opening to the bore;

an upper track slidably mounted in the bore in the lower track;

a seat support arm connected to the upper track and slidably extending outward through the slot in the lower track;

means for anchoring a seat belt to said seat support arm;

bearing means disposed in the bore in the lower track between the upper track and the lower track for slidingly engaging the upper track to the lower track;

support means, connected to the lower track, for mounting the lower track to a floor of a vehicle; and cooperating resisting means, formed in the upper and lower tracks, for resisting separation of the upper track from the lower track; and lock means for releasably locking the upper track against movement relative to the lower track.

2. The seat adjuster of claim 1 wherein the cooperating resisting means comprises:

at least one notch formed in and extending longitudinally along one of the upper and lower tracks; and at least one flange formed on and extending longitudinally along the other of the upper and lower tracks, the flange extending outward from the other of the upper and lower tracks into the notch to engage the one of the upper and lower tracks under deformation forces tending to move one end of the upper track through the slot in the lower track.

3. The seat adjuster of claim 1 wherein the support means comprises:

first and second support members, each including a vehicle floor mounting portion and a lower track connecting portion; and means for fixedly connecting the lower track connecting portion of each of the first and second support members to opposite ends of the lower track.

4. The seat adjuster of claim 3 wherein:

the support members are formed of plastic; and further comprising:

adhesive means for adhesively joining the support members to opposite ends of the lower track.

5. The seat adjuster of claim 1 wherein the bearing means comprises:

a cage having at least one row of apertures formed therein, the cage being disposed between the upper and lower tracks; and a roller rollably mounted in each aperture in the cage and engaging the upper and lower tracks.

6. The seat adjuster of claim 1 wherein the lock means comprises:

a generally U-shaped rod having two legs joined by a central bight portion;

an end of each leg of the rod pivotally connected to one of the seat support arms on each upper track, with the two legs extending forwardly to the bight portion extending between the first and second track assemblies; and catch means formed in the seat support arm and the lower track of each of the first and second track assemblies for releasable engagement with the legs of the rod.

7. The seat adjuster of claim 5 further comprising:

a plurality of rows of apertures formed in the cage and spaced apart at a predetermined spacing.

8. The seat adjuster of claim 5 wherein each roller is formed of a plastic material.

9. The seat adjuster of claim 5 wherein each roller is formed of a high compression resistant plastic material.

10. The seat adjuster of claim 1 wherein:

the upper and lower tracks are formed of a lightweight metallic material.

11. The seat adjuster of claim 10 wherein:

the upper and lower tracks are extruded.

12. The seat adjuster of claim 6 wherein the lock means further comprises:

the catch means formed in each lower track;

a complementary notch formed in the seat support arm of each upper track; and each leg having a latch portion to engage the catch means in the lower track and the notch in the seat support arm in the upper track upon pivoting of the rod about the ends of the legs in a first direction and to disengage the rod therefrom upon pivoting of the rod in a second, opposite direction.

13. The seat adjuster of claim 12 wherein the catch means comprises:

a plurality of spaced, co-linear, open-ended notches formed in the lower track; and the latch portion of each leg of the rod releasably engaging the notches in the lower track when pivoted in the first direction.

14. The seat adjuster of claim 13 further comprising:

a pair of flanges extending outward from the lower track and forming the slot in the lower track therebetween; and the notches being formed in each flange and aligned flange-to-flange as a plurality of pairs of notches.

15. A seat adjuster for supporting a vehicle seat on a floor of a vehicle comprising:

first and second space track assemblies, each of the first and second track assemblies including:

a lower track having a bore extending longitudinally therethrough, a longitudinally extending slot formed in the lower track and opening to the bore;

an upper track slidably mounted in the bore in the lower track;

a seat support arm connected to the upper track and slidably extending outward through the slot in the lower track;

bearing means disposed in the bore in the lower track between the upper track and the lower track for slidingly engaging the upper track to the lower track;

support means, connected to the lower track, for mounting the lower track to the floor of a vehicle;

a pair of notches spacedly formed on and extending longitudinally along one of the upper and lower tracks; and a pair of spaced flanges formed on and extending longitudinally along the other of the upper and lower tracks, the flanges extending outward into the notches in the one of the upper and lower tracks to engage the one of the upper and lower tracks under deformation forces tending to move one end of the upper track through the slot in the lower track; and lock means for releasably locking the upper track against movement relative to the lower track.

16. The seat adjuster of claim 15 wherein:

the pair of notches are formed in the lower track and open to the bore in the lower track; and the pair of flanges are formed in the upper track.

17. A seat adjuster for supporting a vehicle seat on a floor of a vehicle comprising:

first and second space track assemblies, each of the first and second track assemblies including:
a lower track having a bore extending longitudinally therethrough, a longitudinally extending slot formed in the lower track and opening to the bore;
an upper track slidably mounted in the bore in the lower track;
a seat support arm connected to the upper track and slidably extending outward through the slot in the lower track;
bearing means disposed in the bore in the lower track between the upper track and the lower track for slidingly engaging the upper track to the lower track;
first and second support members, each including a vehicle floor mounting portion and a lower track connecting portion;
means for fixedly connecting the lower track connecting portion of each of the first and second support members to opposite ends of the lower track;
an aperture formed in the lower track connecting portion of each of the first and second support members and sized to permit the upper track to slidingly pass through and to prevent the bearing means from sliding therepast; and
cooperating resisting means, formed in the upper and lower tracks, for resisting separation of the upper track from the lower track; and
lock means for releasably locking the upper track against movement relative to the lower track.

18. The seat adjuster of claim 17 further comprising:
a plurality of spaced bores formed in opposite ends of the lower track and surrounding the bore in the lower track;
the lower track connecting portion of each of the support members including corresponding apertures, each alignable with one of the bores in the lower track; and
fastening means, mountable in the aligned apertures and bores, for connecting each support member to one end of the lower track.

19. The seat adjuster of claim 18 wherein the support members are formed of metal.

20. The seat adjuster of claim 18 wherein the support members are formed of plastic.

21. A seat adjuster for supporting a vehicle seat on a floor of a vehicle comprising:

first and second space track assemblies, each of the first and second track assemblies including:
a lower track having a bore extending longitudinally therethrough, a longitudinally extending slot formed in the lower track and opening to the bore;
an upper track slidably mounted in the bore in the lower track;
a seat support arm connected to the upper track and slidably extending outward through the slot in the lower track;
bearing means disposed in the bore in the lower track between the upper track and the lower track for slidingly engaging the upper track to the lower track;
first and second support members, each including a vehicle floor mounting portion and a lower track connecting portion;
means for fixedly connecting the lower track connecting portion of each of the first and second support members to opposite ends of the lower track;
stop means, mounted on each seat support arm and engageable with the lower track connecting portion of each of the support members, for limiting the maximum extent of movement of the upper track with respect to the lower track in two opposed directions;
cooperating resisting means, formed in the upper and lower track, for resisting separation of the upper track from the lower track; and
lock means for releasably locking the upper track against movement relative to the lower track.

22. The seat adjuster of claim 21 wherein the stop means comprises:
first and second pins spacedly mounted on the extending outward from each seat support arm.

23. A seat adjuster for supporting a vehicle seat on a floor of a vehicle comprising:

first and second space track assemblies, each of the first and second track assemblies including:
a lower track having a bore extending longitudinally therethrough, a longitudinally extending slot formed in the lower track and opening to the bore;
an upper track slidably mounted in the bore in the lower track;
a seat support arm connected to the upper track and slidably extending outward through the slot in the lower track;
a cage having at least one row of apertures formed therein, the cage being disposed between the upper and lower tracks;
a roller rollably mounted in each aperture in the cage engaging the upper and lower tracks;
the upper track having a plurality of angularly disposed exterior faces; p2 the cage including a body formed to the shape or the upper track, the apertures being disposed adjacent to one of the faces of the upper track for mounting a roller in contact with one of the faces of the upper track;
support means, connected to the lower track, for mounting the lower track to the floor of a vehicle; and
cooperating resisting means, formed in the upper and lower tracks, for resisting separation of the upper track from the lower track; and
lock means for releasably locking the upper track against movement relative top the lower track.

24. A seat adjuster for supporting a vehicle seat on a floor of a vehicle comprising:

first and second space track assemblies, each of the first and second track assemblies including:
a lower track formed of an extruded lightweight metallic material and having a bore extending longitudinally therethrough, a longitudinally extending slot formed in the lower track and opening to the bore;
an upper track formed of an extruded lightweight metallic material and slidably mounted in the bore in the lower track;

a seat support arm connected to the upper track and slidably extending outward through the slot in the lower track, the upper track and the seat support arm being integrally formed of extruded aluminum;

means for anchoring a seat belt to said support arm;

bearing means disposed in the bore in the lower track between the upper track and the lower track for slidingly engaging the upper track to the lower track, the bearing means including a plurality of rolling elements formed of a plastic material having high compression resistance;

support means, connected to the lower track, for mounting the lower track to a floor of a vehicle;

cooperating resisting means, formed in the upper and lower tracks, for resisting separation of the upper track from the lower track; and lock means for releasably locking the upper track against movement relative to the lower track.

25. The seat adjuster of claim 24 wherein the support means comprises:

first and second support members, each including a vehicle floor mounting portion and a lower track connecting portion;

the lower track connecting portion of each of the first and second support members to opposite ends of the lower track.

26. The seat adjuster of claim 24 wherein the cooperating resisting means comprises:

at least one notch formed in and extending longitudinally along one of the upper and lower tracks; and at least one flange formed on and extending longitudinally along the other of the upper and lower tracks, the flange extending outward from the other of the upper and lower tracks into the notch to engage the one of the upper and lower tracks under deformation forces tending to move one end of the upper track through the slot in the lower track.

27. The seat adjuster of claim 25 wherein:

the support members are formed of plastic; and further comprising:

adhesive means for adhesively joining the support members to opposite ends of the lower track.

28. The seat adjuster of claim 24 wherein the lock means comprises:

a generally U-shaped rod having two legs joined by a central bight portion;

an end of each leg of the rod pivotally connected to one of the seat support arms on each upper track, with the two legs extending forwardly to the bight portion extending between the first and second track assemblies; and catch means formed in the seat support arm and the lower track of each of the first and second track assemblies for releasable engagement with the legs of the rod.

29. The seat adjuster of claim 24 wherein the bearing means further comprises:

a cage having at least one row of apertures formed therein, the cage being disposed between the upper and lower tracks; and one rolling element rollably mounted in each aperture in the cage and engaging the upper and lower tracks.

30. The seat adjuster of claim 28 wherein the lock means further comprises:

the catch means formed in each lower track;

a complementary notch formed in the seat support arm of each upper track; and each leg having a latch portion to engage the catch means in the lower track and the notch in the seat support arm in the upper track upon pivoting of the rod about the ends of the legs in a first direction and to disengage the rod therefrom upon pivoting of the rod in a second, opposite direction.

31. The seat adjuster of claim 30 wherein the catch means comprises:

a plurality of spaced, co-linear, open-ended notches formed in the lower track; and the latch portion of each leg of the rod releasably engaging the notches in the lower track when pivoted in the first direction.

32. The seat adjuster of claim 31 further comprising:

a pair of flanges extending outward from the lower track and forming the slot in the lower track therebetween; and the notches being formed in each flange and aligned flange-to-flange as a plurality of pairs of notches.

33. A seat adjuster for supporting a vehicle seat on a floor of a vehicle comprising:

first and second space track assemblies, each of the first and second track assemblies including:

a lower track formed of an extruded lightweight metallic material and having a bore extending longitudinally therethrough, a longitudinally extending slot formed in the lower track and opening to the bore;

an upper track formed of an extruded lightweight metallic material and slidably mounted in the bore in the lower track;

a seat support arm connected to the upper track and slidably extending outward through the slot in the lower track, the upper track and the seat support arm being integrally formed of extruded aluminum;

a cage having at least one row of apertures formed therein, the cage being disposed between the lower and upper tracks;

one rolling element rollably mounted in each aperture in the cage and engaging the upper and lower tracks;

the upper track having a plurality of angularly disposed exterior faces;

the cage including a body formed to the shape of the upper track, the apertures being disposed adjacent to one of the faces of the upper track for mounting a roller in contact with one of the faces of the upper track;

support means, connected to the lower track, for mounting the lower track to a floor of a vehicle; and lock means for releasably locking the upper track against movement relative to the lower track.

34. The seat adjuster of claim 33 further comprising:

a plurality of rows of apertures formed in the cage and spaced apart at a predetermined spacing.

35. A seat adjuster for supporting a vehicle seat on a floor of a vehicle comprising:

first and second space track assemblies, each of the first and second track assemblies including:

a lower track formed of an extruded lightweight metallic material and having a bore extending longitudinally therethrough, a longitudinally extending slot formed in the lower track and opening to the bore;

an upper track formed of an extruded lightweight metallic material and slidably mounted in the bore in the lower track;

a seat support arm connected to the upper track and slidably extending outward through the slot in the lower track, the upper track and the seat support arm being integrally formed of extruded aluminum;

bearing means disposed in the bore in the lower track between the upper track and the lower track for slidably engaging the upper track to the lower track, the bearing means including a plurality of rolling elements formed of a plastic material having high compression resistance;

support means, connected to the lower track, for mounting the lower track to a floor of a vehicle;

a pair of notches spacedly formed on and extending longitudinally along one of the upper and lower tracks; and a pair of spaced flanges formed on and extending longitudinally along the other of the upper and lower tracks, the flanges extending outward into the notches in one of the upper and lower tracks to engage one of the upper and lower tracks under deformation forces tending to move one end of the upper track through the slot in the lower track; and lock means for releasably locking the upper track against movement relative to the lower track.

36. The seat adjuster of claim 35 wherein:

the pair of notches are formed in the lower track and open to the bore in the lower track; and the pair of flanges are formed in the upper track.

37. A seat adjuster for supporting a vehicle seat on a floor of a vehicle comprising:

first and second space track assemblies, each of the first and second track assemblies including:

a lower track formed of an extruded lightweight metallic material and having a bore extending longitudinally therethrough, a longitudinally extending slot formed in the lower track and opening to the bore;

an upper track formed of an extruded lightweight metallic material and slidably mounted in the bore in the lower track;

a seat support arm connected to the upper track and slidably extending outwardly through the slot in the lower track, the upper track and the seat support arm being integrally formed of extruded aluminum;

bearing means disposed in the bore in the lower track between the upper track and the lower track for slidingly engaging the upper track to the lower track, the bearing means including a plurality of rolling elements formed of a plastic material having high compression resistance;

first and second support members, each including a vehicle floor mounting portion and a lower track connecting portion;

means for fixedly connecting the lower track connecting portion of each of the first and second support members to opposite ends of the lower track; and an aperture formed in the lower track connecting portion of each of the first and second support members and sized to permit the upper track to slidingly pass through and to prevent the bearing means for sliding therepast;

lock means for releasably locking the upper track against movement relative to the lower track.

38. A seat adjuster for supporting a vehicle seat on a floor of a vehicle comprising:

first and second space track assemblies, each of the first and second track assemblies including:

a lower track formed of an extruded lightweight metallic material and having a bore extending longitudinally therethrough, a longitudinally extending slot formed in the lower track and opening to the bore;

an upper track formed of an extruded lightweight metallic material and slidably mounted in the bore in the lower track;

a seat support arm connected to the upper track and slidably extending outward through the slot in the lower track, the upper track and the seat support arm being integrally formed of extruded aluminum;

bearing mans disposed in the bore in the lower track between the upper track and the lower track for slidingly engaging the upper track to the lower track, the bearing means including a plurality of rolling elements formed of a plastic material having high compression resistance;

first and second support members, each including a vehicle floor mounting portion and a lower track connecting portion;

means for fixedly connecting the lower track connecting portion of each of the first and second support members to opposite ends of the lower track;

stop means, mounted on each seat support arm and engageable with the lower track connecting portion of each of the support members, for limiting the maximum extent of movement of the upper track with respect to the lower track in two opposed directions; and lock means for releasably locking the upper track against movement relative to the lower track.

39. The seat adjuster of claim 38 wherein the stop means comprises:

first and second pins spacedly mounted on and extending outward from each seat support arm.

40. A seat adjuster for supporting a vehicle seat on a floor of a vehicle comprising:

first and second space track assemblies, each of the first and second track assemblies including:

a lower track formed of an extruded lightweight metallic material and having a bore extending longitudinally therethrough, a longitudinally extending slot formed in the lower track and opening to the bore;

an upper track formed of an extruded lightweight metallic material and slidably mounted in the bore in the lower track;

a seat support arm connected to the upper track and slidably extending outward through the slot in the lower track, the upper track and the seat support arm being integrally formed of extruded aluminum;

bearing means disposed in the bore in the lower track between the upper track and the lower track for slidingly engaging the upper track to the lower track, the bearing means including a plurality of rolling elements formed of a plastic material having high compression resistance;

first and second support members, each including a vehicle floor mounting portion and a lower track connecting portion;

means for fixedly connecting the lower track connecting portion of each of the first and second support members to opposite ends of the lower track; and a plurality of spaced bores formed in opposite ends of the lower track and surrounding the bore in the lower track;

the lower track connecting portion of the each of the support members including corresponding apertures, each alignable with one of the bores in the lower track; and fastening means, mountable in the aligned apertures and bores, for connecting each support member to one end of the lower track; and lock means for releasably locking the upper track against movement relative to the lower track.

41. The seat adjuster of claim 40 wherein the support members are formed of metal.

42. The seat adjuster of 40 wherein the support members are formed of plastic.

43. A seat adjuster for supporting a vehicle seat on a floor of a vehicle comprising:

a first and second space track assemblies, each of the first and second track assemblies including:

a lower track;

an upper track having a seat support arm connected thereto;

means for slidably mounting the upper track to the lower track;

means for anchoring a seat belt to said seat support arm;

support means, connected to the lower track, for mounting the lower track to the floor of the vehicle;

a pair of notches spacedly formed on and extending longitudinally along one of the upper and lower tracks; and a pair of spaced flanges formed on and extending longitudinally along the other of the upper and lower tracks, the flanges extending outward into the notches in the one of the upper and lower tracks to engage the one of the upper and lower tracks under deformation forces tending to move one end of the upper track through the slot in the lower track; and lock means for releasably locking the upper track against movement relative to the lower track.

44. A seat adjuster for supporting a vehicle seat on a floor of a vehicle comprising:

first and second space track assemblies, each of the first and second track assemblies including:

a lower track formed of an extruded lightweight metallic material and having a bore extending longitudinally therethrough, a longitudinally extending slot formed in the lower track and opening to the bore;

an upper track formed of an extruded lightweight metallic material and slidably mounted in the bore in the lower track, the upper track having a plurality of angularly disposed exterior faces;

a seat support arm connected to the upper track and slidably extending outward through the slot in the lower track, the upper track and the seat support arm being integrally formed of extruded aluminum;

bearing means disposed in the bore in the lower track between the upper track and the lower track for slidingly engaging the upper track to the lower track, the bearing means including:

a cage having a plurality of spaced rows of apertures formed therein, the cage being disposed between the upper and lower tracks and conformed to the shape of the inner track with each aperture disposed adjacent to an exterior face of the inner track;

a roller rollably mounted in each aperture in the cage and engaging the upper and lower tracks, each roller formed of a plastic material having high compression resistance;

support means, connected to the lower track, for mounting the lower track to a floor of a vehicle;

cooperating resisting means, formed in the upper and lower tracks, for resisting separation of the upper track from the lower track in a direction substantially perpendicular to a longitudinal axis of the bore in the lower track, the cooperating resisting means including:

a pair of notches spacedly formed on and extending longitudinally along the lower track and opening to the bore in the lower track; and a pair of spaced flanges formed on and extending longitudinally along the upper track, the flanges extending outward into the notches in the lower track to engage the one of the upper and lower tracks under deformation forces tending to move one end of the upper track through the slot in the lower track; and lock means for releasably locking the upper track against movement relative to the lower track.

* * * * *